(12) United States Patent
Hall et al.

(10) Patent No.: US 11,898,541 B2
(45) Date of Patent: Feb. 13, 2024

(54) WIND TURBINE BLADE WITH A LIGHTNING PROTECTION SYSTEM

(71) Applicants: Pinnacle Lightning Protection, LLC, Williamstown, MA (US); Power Curve ApS, Aalborg (DK)

(72) Inventors: Adam Hall, Williamstown, MA (US); Allen Hall, Williamstown, MA (US); Nicholas Gaudern, Aalborg SV (DK)

(73) Assignees: Pinnacle Lightning, LLC, Williamstown, MA (US); PowerCurve ApS, Aalborg (DK)

( * ) Notice: Subject to any disclaimer, the term of this patent is extended or adjusted under 35 U.S.C. 154(b) by 0 days.

(21) Appl. No.: 17/747,936

(22) Filed: May 18, 2022

(65) Prior Publication Data
US 2023/0374974 A1 Nov. 23, 2023

(51) Int. Cl.
*F03D 80/30* (2016.01)
*F03D 1/06* (2006.01)

(52) U.S. Cl.
CPC ........... *F03D 80/30* (2016.05); *F03D 1/0675* (2013.01); *F05B 2240/307* (2020.08)

(58) Field of Classification Search
CPC ... F03D 80/30; F03D 1/0675; F05B 2240/307
See application file for complete search history.

(56) References Cited

U.S. PATENT DOCUMENTS

| | | | |
|---|---|---|---|
| 9,644,613 B2 | 5/2017 | Erichsen | |
| 10,024,308 B2 | 7/2018 | Enevoldsen et al. | |
| 2013/0149154 A1* | 6/2013 | Kuroiwa | B29C 70/304 |
| | | | 416/146 R |
| 2017/0314532 A1* | 11/2017 | Kirkegaard | C08G 18/6511 |

FOREIGN PATENT DOCUMENTS

| | | | |
|---|---|---|---|
| CN | 207245925 U | * | 4/2018 |
| EP | 3655644 A1 | | 5/2020 |
| GB | 2527035 A | | 12/2015 |
| JP | 2008115783 A | | 5/2008 |
| WO | 2019015731 A1 | | 1/2019 |

OTHER PUBLICATIONS

Machine Translation of CN 207245925 U PDF file name: "CN207245925U_Machine_Translation.pdf".*
Search Report issued in International Application No. PCT/EP2023/063316, dated Aug. 31, 2023.

* cited by examiner

*Primary Examiner* — Grant Moubry
*Assistant Examiner* — Ruben Picon-Feliciano
(74) *Attorney, Agent, or Firm* — Bookoff McAndrews, PLLC

(57) ABSTRACT

Wind turbine blade comprising a lightning protection system, said lightning protection system comprising a first lightning receptor mounted near the tip of the blade and an electrical conductor electrically connecting the first lightning receptor and the base of the wind turbine blade. The lightning protection system further comprises a first aerodynamic fence attached to the wind turbine blade between the lightning receptor and the tip of the blade. In this way, a zone of smoother airflow is provided which makes a more effective target for lightning to strike, thereby avoiding damage to other parts of the blade.

10 Claims, 4 Drawing Sheets

WIND TURBINE BLADE WITH A LIGHTNING PROTECTION SYSTEM

FIELD OF THE INVENTION

The current invention relates to a wind turbine blade comprising a lightning protection system, said lightning protection system comprising a first lightning receptor mounted near the tip of the blade and an electrical conductor electrically connecting the first lightning receptor and the base of the wind turbine blade.

BACKGROUND OF THE INVENTION

It is well known in the art of wind turbine blades, that a lightning strike to a blade can have serious consequences for the blade. In a worst case the entire blade can be destroyed which effectively renders the entire wind turbine useless and the entire blade needs to be replaced before the wind turbine can run again. In a less severe case, the wind turbine blade could survive, but be structurally damaged which can both make the blade perform poorly and also lead to reduced lifetime and higher risk of catastrophic failure of the blade.

As such, many lightning protection systems have been proposed in the literature and many different systems have been implemented in practice. Most systems provide one or more lightning receptors in the form of one or more metal plates which are bolted to or embedded in the wind turbine blade itself. Typically the lightning receptors are mounted near the tip of the blade. Lightning receptors can be mounted to the suction side, to the pressure side or to both sides.

Lightning receptors are then electrically connected to the base of the wind turbine blade via one or more electrical conductors running along the inside of the blade. The base of the blade is electrically connected to an electrical conductor running down the wind turbine tower to conduct lightning electrical energy to the ground. When lightning hits the blade, the concept is that the lighting is attracted to the lightning receptor on the blade and thereby hits the lightning receptor which allows the energy of the lightning strike to be absorbed by the lightning receptor and be conducted to the ground.

In certain cases, multiple lightning receptors are attached in an array of lightning receptors around the tip area of the blade. Each of the lightning receptors is electrically connected to the base of the blade via an electrical conductor. In other cases, instead of embedding lightning receptors in the blade itself, the entire tip of the blade could be made of metal and form one big lightning receptor at the tip of the blade. In certain cases, the blade can have a metal mesh embedded within the laminate for the outer few metres of blade. In this case, multiple separate receptors could be linked to the mesh, and then the down conductor could be attached to the inboard end of the mesh.

However, even though the concept of the lightning receptors seems to be clear, it is an observed fact in the industry that even with multiple lightning receptors mounted on the blade, lightning can still strike unprotected areas of the blade, causing serious structural damage or even catastrophic failures.

SUMMARY OF THE INVENTION

It is therefore a first aspect of the current invention to provide a lightning protection system for a wind turbine blade which is better at capturing the lightning strike at a lightning receptor.

A second aspect of the current invention is to provide an improved lightning protection system which can be easily mounted on an existing wind turbine blade.

A third aspect of the current invention is to provide an improved lightning protection system which does not incur significant costs.

At least some of these aspects are provided at least in part by a wind turbine blade with a lightning protection system according to claim 1.

In this way, the flow around the lighting receptor can be made smoother. While not being bound by this theory, it has been observed that wind turbine blades can have significant turbulent flows around the tip of the turbine blade. This is especially true for blades which have been active in the field for a while. During normal use and exposure to the weather and dirt/dust/bugs/etc., the leading edge of the blade becomes worn and more turbulent flow is created. In the prior art systems, the lightning receptors are mounted in this area of turbulent air. According to the current invention, by providing an aerodynamic fence outward of the lightning receptor to reduce the cross flow in the area of the lightning receptor, the air flow around the lightning receptor is made smoother and a lightning strike is thereby more likely to find the receptor.

According to this specification, an aerodynamic fence is defined as an elongated fin, extending essentially vertically from the surface of the wind turbine blade, said fin being arranged essentially along a plane which is parallel to the chord of the blade at the location of the fin. In some embodiments, the phrase "essentially vertically" could be interpreted as +/−20 degrees, +/−15 degrees or +/−10 degrees to the normal of the surface. The intent of the aerodynamic fence is to stop crossflow (flow along the longitudinal axis of the blade) on the surface of the blade. In some embodiments, the fin has a length which is greater than 50% of the chord length of the blade at the location of the fin. In some embodiments, the fin has a height which is greater than 1% of the chord length of the blade at the location of the fin. In some embodiments, the fin has a height which is less than 10% of the chord length of the blade at the location of the fin.

Within the scope of the current invention, the electrical conductor could comprise multiple separate electrical conductors electrically connected together. For example, a first portion arranged inside the blade and a second portion arranged outside the blade. Likewise, the electrical conductor can comprise multiple different types of electrical conductors electrically connected together. For example, a first portion which is a wire running inside the blade and a second portion which is conductive tape arranged on the surface of the blade. Additional combinations and different number of portions could also be imagined.

It should also be noted that the first lightning receptor according to claim 1 could be a "legacy" lightning receptor which is bolted into or integrated with the blade in the factory, or it could be a lightning receptor which is attached to the blade in the field, for example a surface mounted lightning receptor which is attached to the surface of the blade via an adhesive or one or more mechanical fasteners. Other forms of lightning receptors are also possible.

It should also be noted that the lightning protection system as defined in claim 1 could be mounted to the suction surface and/or to the pressure surface. In most embodiments, a similar arrangement will be made on both the suction side and the pressure surface of the blade.

In some embodiments, the first lightning receptor is a lightning receptor which has a shape which extends more than 0.5 cm away from the surface of the blade. In some embodiments, the lightning receptor will extend less than 10 cm, less than 7 cm or less than 5 cm from the surface of the blade. In some embodiments, the first lightning receptor has an aerodynamic shape to reduce its drag. In some embodiments, the aerodynamic shape is a teardrop formed shape when seen from the top.

In some embodiments, the distance from the first lightning receptor to the aerodynamic fence is less than 1 m, less than 75 cm or less than 50 cm and the distance from the first lighting receptor to the aerodynamic fence is greater than 10 cm, greater than 20 cm or greater than 30 cm.

In some embodiments, the distance from the tip of the blade to the first lightning receptor is greater than 50 cm, greater than 75 cm or greater than 100 cm and the distance from the tip of the blade to the first lightning receptor is less than 400 cm, less than 350 cm or less than 300 cm.

In some embodiments, the wind turbine blade further comprises a second lightning receptor which is integrated into the blade, in that said electrical conductor comprises a first portion which is arranged between the second lightning receptor and the base of the blade and in that the first lightning receptor is surface mounted on the surface of the blade and in that the electrical conductor comprises a second portion which is surface mounted on the blade and is arranged between the first lightning receptor and the second lightning receptor. In this way, an existing lightning protection system can be upgraded with the current invention in a simple manner, thereby making the blade more lightning proof. In some embodiments, the second portion of the electrical conductor is arranged to pass around the first aerodynamic fence.

In some embodiments, said first aerodynamic fence comprises a metal insert passing through a body portion of the first aerodynamic fence from a first side of the aerodynamic fence which faces the tip of the blade to a second side of the aerodynamic fence which faces the base of the blade and in that the second portion of the electrical conductor comprises a first part arranged between the first lightning receptor and the metal insert and a second part arranged between the metal insert and the second lightning receptor. In this way, instead of leading electrical energy around the aerodynamic fence, electrical energy can be lead through the aerodynamic fence.

In some embodiments, the second portion of the electrical conductor comprises one or more segmented lightning diverter strips. In some embodiments, the one or more segmented lightning diverter strips is/are StrikeTape. StrikeTape is a commercially marketed product.

In some embodiments, said second portion of the electrical conductor and/or the first lightning receptor are attached to the blade via an adhesive.

In some embodiments, the wind turbine blade further comprises an aftermarket leading edge protection product to reduce surface abnormalities on the leading edge of the wind turbine blade, said leading edge protection product being arranged at least between the radial position of the first lightning receptor and the aerodynamic fence. In some embodiments, an aftermarket leading edge protection product is arranged to extend towards the base of the blade from the first lightning receptor. In some embodiments, the aftermarket leading edge protection product extends at least 30 cm, at least 40 cm or at least 50 cm towards the base of the blade from the first lightning receptor. In some embodiments, the aftermarket leading edge protection product extends towards the tip of the blade from the aerodynamic fence. In some embodiments, the aftermarket leading edge protection product extends at least 30 cm, at least 40 cm or at least 50 cm towards the tip of the blade from the aerodynamic fence.

In some embodiments, said wind turbine blade further comprises a second aerodynamic fence located between the first lightning receptor and the base of the blade. In some embodiments, the distance between the first lightning receptor and the second aerodynamic fence is less than two times the distance from the first lighting protection to the first aerodynamic fence.

In some embodiments, a flow disturbance element is added to the surface of the blade at a radial location between the base of the blade and the first lightning receptor. In some embodiments, the flow disturbance element comprises one or more vortex generators. In some embodiments, the flow disturbance element comprises a plurality of flow disturbance elements. In some embodiments, the flow disturbance element closest to the first lightning receptor is at least 30 cm, at least 40 cm or at least 50 cm away from the first lightning receptor. In some embodiments, the flow disturbance element closest to the first lightning receptor is less than 150 cm, less than 120 cm or less than 100 cm away from the first lightning receptor. By adding one or more flow disturbing elements, for example one or more vortex generators, on the inward side of the first lightning receptor, the clean air flow zone around the first lightning receptor is made even more attractive for the lighting to strike.

It should be noted that in the claims, claim 1 and its dependent claims define a first main invention related to a combination of a lighting receptor and an aerodynamic fence mounted between the lightning receptor and the tip of the blade.

However, the current specification also discloses a second invention which could become the subject of a divisional application which could be filed in the future. The second invention relates to a wind turbine blade with a lightning protection system, said lightning protection system comprising a first lightning receptor mounted near the tip of the blade and an electrical conductor electrically connecting the first lightning receptor and the base of the wind turbine blade and said lightning protection system further comprising a second lightning receptor which is integrated into the blade and where the electrical conductor comprises a first portion which is arranged between the second lightning receptor and the base of the blade, and where the first lightning receptor is surface mounted on the surface of the blade and in that the electrical conductor comprises a second portion which is surface mounted on the blade and is arranged between the first lightning receptor and the second lightning receptor. In this way, the first lightning receptor can be an aftermarket receptor which is surface mounted to the blade in a simple and inexpensive manner while the second lightning receptor is a legacy lightning receptor which was integrated with the blade during original manufacturing.

In some embodiments, the first portion of the electrical conductor is arranged on the inside of the blade. In this way, the first portion of the electrical conductor can be a component of the blade as manufactured in the factory.

It should be noted that the features of the lightning protection system described above and in the claims can be combined with this second invention to define additional dependent claims. For example, the second invention could be combined with leading edge protection in the area around the first lightning receptor.

It should be emphasized that the term "comprises/comprising/comprised of" when used in this specification is taken to specify the presence of stated features, integers, steps or components but does not preclude the presence or addition of one or more other features, integers, steps, components or groups thereof.

BRIEF DESCRIPTION OF THE DRAWINGS

In the following, the invention will be described in greater detail with reference to embodiments shown by the enclosed figures. It should be emphasized that the embodiments shown are used for example purposes only and should not be used to limit the scope of the invention.

DETAILED DESCRIPTION OF THE EMBODIMENTS

Figure 1:
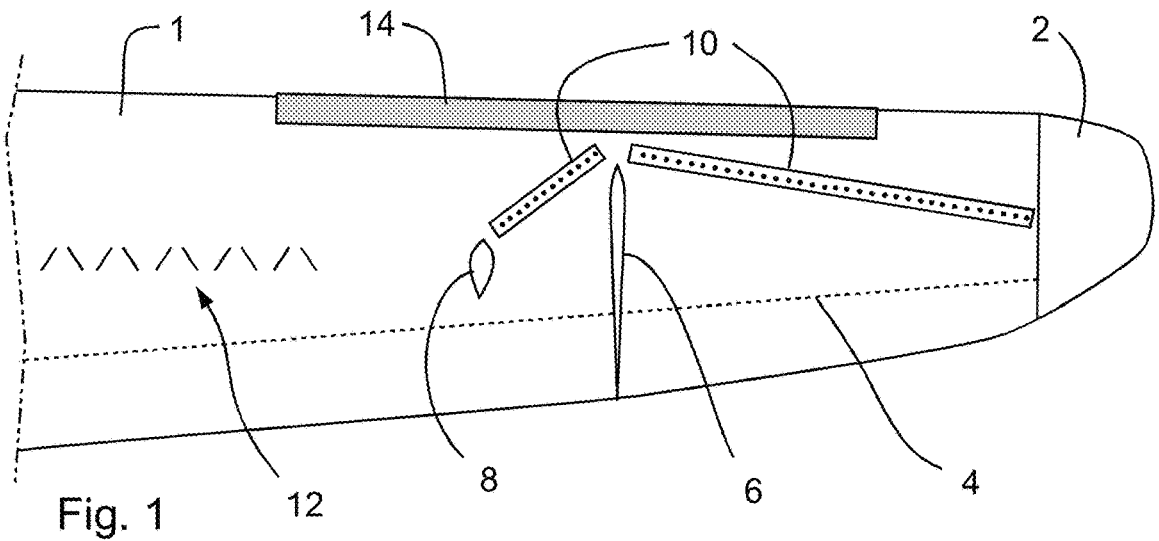
FIG. 1 shows a schematic top view of a first embodiment of a wind turbine blade with a lightning protection system according to the current invention.

FIG. 1 shows an outer portion of a wind turbine blade 1 with a metal tip 2 electrically connected to the base of the blade via an electrical conductor 4 arranged inside the blade. The electrical conductor is shown as a dotted line travelling parallel to the trailing edge in this example, however the electrical conductor could be arranged in many different ways as will be known to the person skilled in the art. The metal tip is provided to attract a lightning strike so that when lightning hits the blade, it is expected that the lightning will strike the metal tip instead of the more vulnerable parts of the turbine blade. This lightning protection system is as well known in the art and is implemented on many turbine blades already in the field. In certain cases, instead of a metal tip, a metal plate is embedded in the surface of the turbine blade and electrically connected to the base of the blade via the electrical conductor.

In order to improve the lightning protection, according to the current invention, an aerodynamic fence 6 is surface mounted to the blade. Furthermore a surface mounted lightning receptor 8 is mounted on the surface of the blade on the side of the aerodynamic fence which is closest to the root of the blade. The surface mounted lightning receptor is mounted around 30 cm from the aerodynamic fence. In order to connect the surface mounted lightning receptor to the base of the blade, surface mounted electrical conductor strips 10 are mounted to the surface of the blade between the surface mounted lighting receptor 8 and the metal tip 2. In the terminology of the claims, the surface mounted lighting receptor would be considered the first lightning receptor and the metal tip would be considered the second lightning receptor. Likewise the surface mounted conductor strips would be considered the second portion of the electrical conductor and the integrated electrical conductor 4 would be considered the first portion of the electrical conductor.

In this embodiment, the surface mounted lightning receptor is in the form of a solid, machined metal part of steel with approximate dimensions of 90 mm long, 30 mm wide and 10 mm high. The surface mounted lightning receptor is attached to the surface of the blade via a suitable adhesive which will be known to the person skilled in the art. In other embodiments, the surface mounted lightning receptor could be attached to the blade via one or more mechanical fasteners, for example screws/bolts. In other embodiments, the surface mounted lightning receptor could be attached to the blade via a combination of adhesive and mechanical fasteners. In order to provide a greater target for the lightning, the lightning receptor could, in some embodiments, be formed such that it sticks up and away from the surface for the wind turbine blade. By arranging the lightning receptor such that it extends away from the surface of the blade, the lightning receptor can extend away from the boundary layer airflow over the blade and in certain cases extend out of the airflow over the blade to reach cleaner air. In the embodiments shown in the figures, the lightning receptor is formed such that from the top it appears as a teardrop shape which reduces the drag of the lightning receptor. Forming the lightning receptor with an aerodynamic shape with low drag is beneficial.

The surface mounted electrical conductor is in this embodiment in the form of a special electrical conductive tape marketed under the name "StrikeTape". StrikeTape is known in the art and will not be described in great detail herein. A more generic name for StrikeTape is a segmented lightning diverter strip. A segmented lightning diverter strip comprises a number of small metal buttons (0.3-mm thick, 10-mm wide) arranged on and along a strip of flexible, high-tech plastic material. Segmented lightning diverter strips will form an ionized channel above the surface they are installed on. This channel can thereby direct the electrical energy safely while greatly reducing destructive heat that can damage the surface of the tape itself and the surface on which it is mounted.

In this embodiment, a set of Vortex Generators 12 have also been added to the surface of the blade on the inside of the surface mounted lightning receptor. The VGs will create turbulent flow creating a greater contrast to the clean zone around the lightning receptor.

Furthermore in this embodiment, leading edge protection tape 14 has been applied to the leading edge in the area around the surface mounted lightning receptor. This has a further effect of cleaning up the airflow around the surface mounted lightning receptor.

The three aerodynamic elements: fence, VGs and Leading edge protection can be used together or separately depending on the desired outcome.

Figure 2:
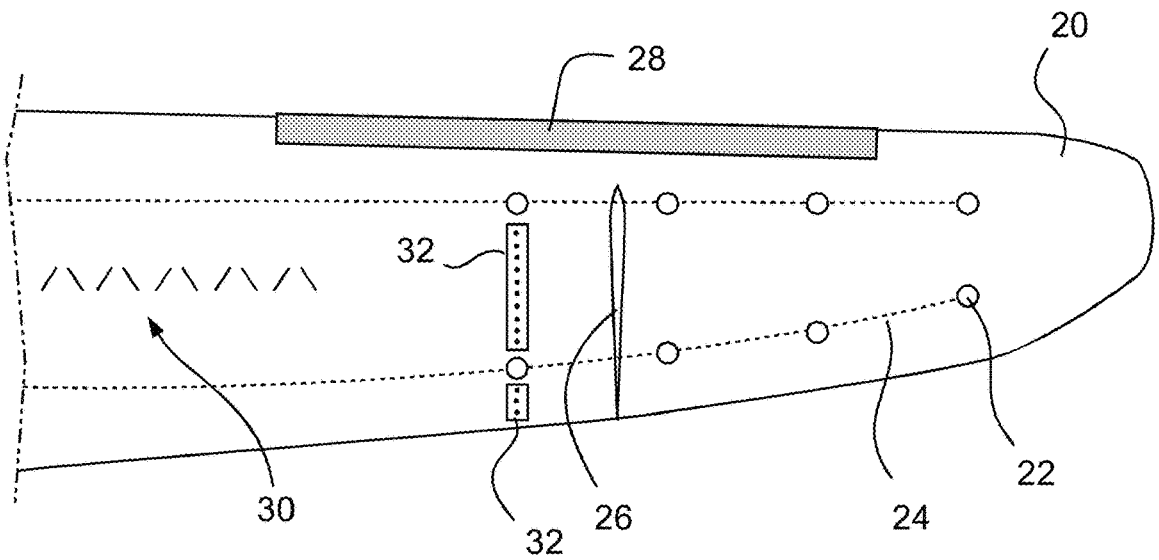
FIG. 2 shows a schematic top view of a second embodiment of a wind turbine blade with a lightning protection system according to the current invention.

FIG. 2 shows a second embodiment of a lightning protection system. In this case, instead of a metal tip, the blade 20 is provided with eight separate lightning receptor plates 22 embedded in the suction surface of the blade and connected to the root of the blade via two electrical conductors 24. In this embodiment, the lightning protection system is mirrored, so that there are eight separate lightning receptor plates on both the suction and the pressure surface, so there are a total of 16 lightning receptor plates in total. Likewise, in the figure, two separate electrical conductors are shown. However, this is just shown schematically. In another system system, the different lightning receptors could be electrically connected together via a cable net and then a single electrical conductor can connect the cable net with the base of the blade.

In this embodiment, an aerodynamic fence 26 has been added between the innermost lightning receptors and the second innermost lightning receptors. Furthermore leading edge protection tape 28 and VGs 30 have also been provided to provide the same effect as described above. Likewise additional StrikeTape 32 has been added to increase the area which is "attractive" for the lightning strike and to conduct part of the electrical energy of a lightning strike towards the other embedded lightning receptors. Again, only the suction surface has been described, but it would be beneficial to make a similar arrangement on the pressure surface as well.

Figure 3:
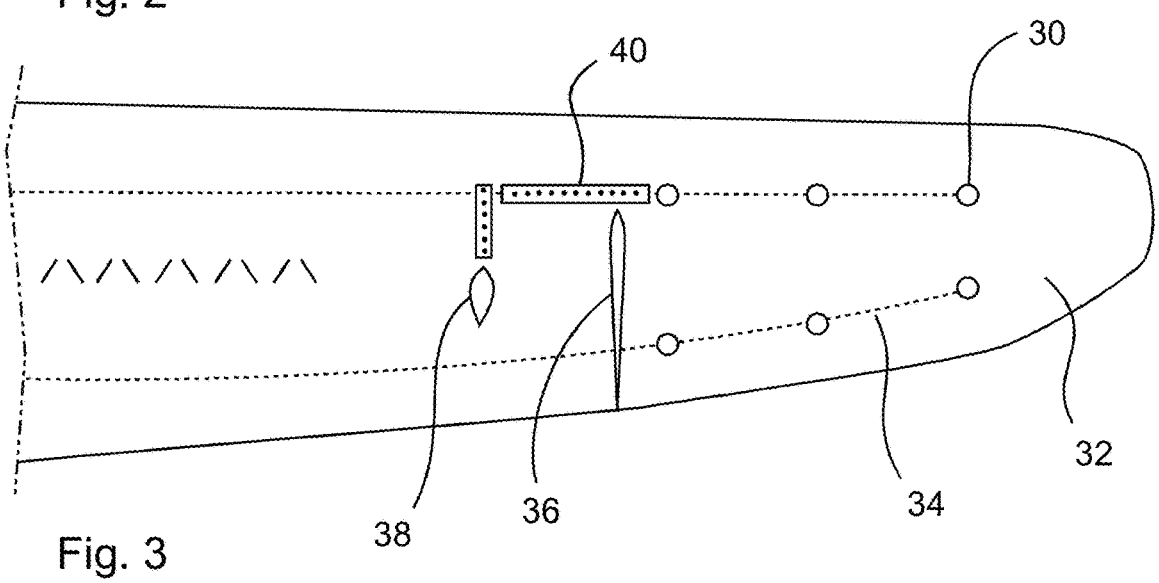
FIG. 3 shows a schematic top view of a third embodiment of a wind turbine blade with a lightning protection system according to the current invention.

FIG. 3 shows a third embodiment of a lightning protection system. In this case, six embedded lightning receptors 30 are embedded in the suction surface of a blade 32 and connected to the base of the blade via electrical connectors 34. An aerodynamic fence 36 is added on the inside of the innermost light receptors. A surface mounted lightning receptor 38 is added on the inside of the fence. StrikeTape 40 is added to conduct electrical energy from the surface mounted lighting receptor to the innermost embedded lightning receptor. Again, a similar arrangement could also be added on the pressure surface in combination with the suction surface arrangement.

Figure 4:
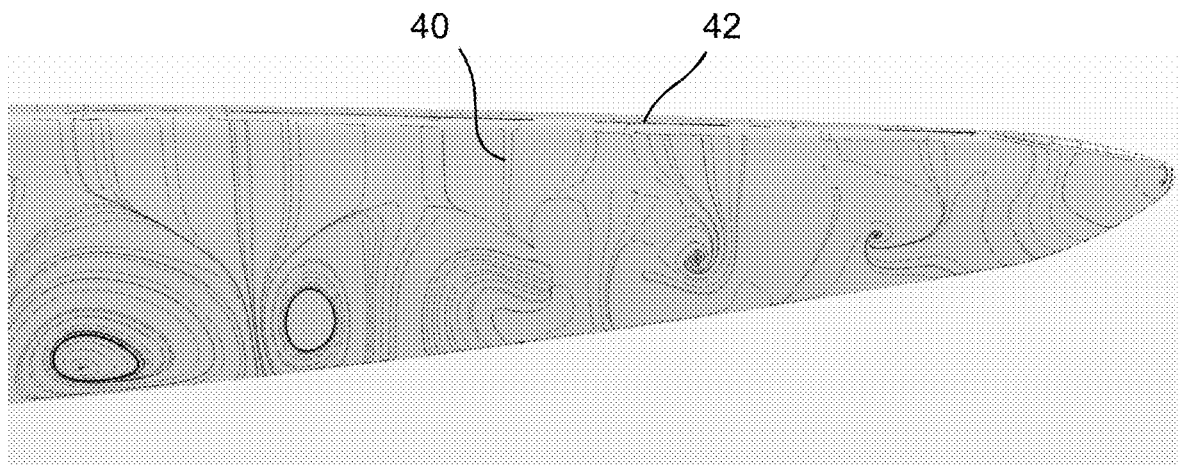
FIG. 4 shows a top view of a CFD simulation of a wind turbine blade with a normal dirty/worn leading edge.
Figure 5:
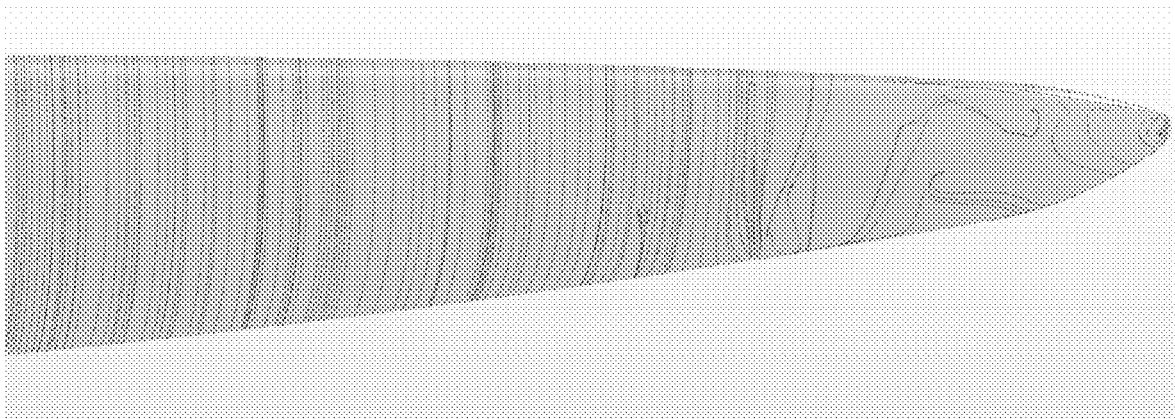
FIGS. 5 and 6 shows a top view of a CFD simulation of a wind turbine blade with an embodiment of a lightning protection system of the kind illustrated in FIG. 1.
Figure 6:
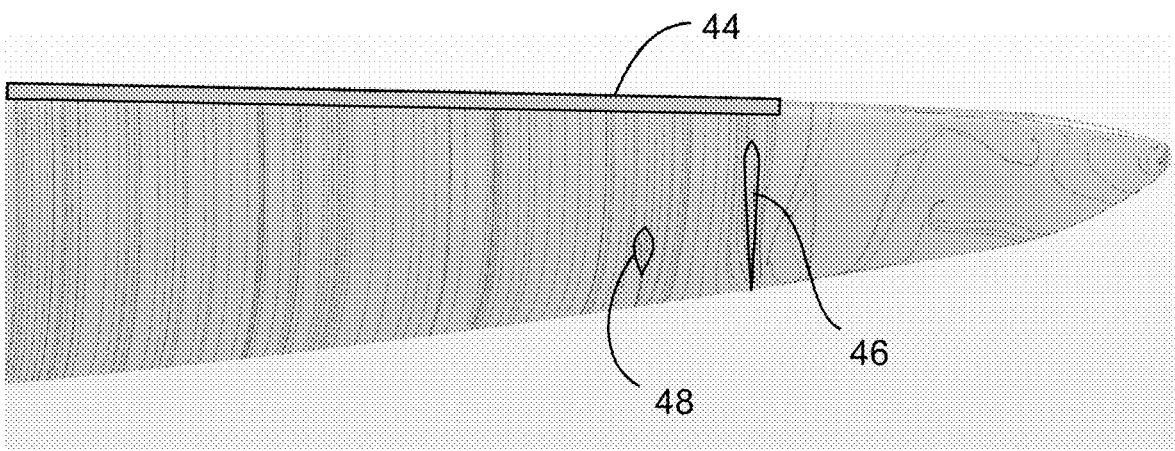

FIG. 4 shows a Computational Fluid Dynamic (CFD) simulation of a typical wind turbine blade. The lines 40 on the surface of the blade represent the stream lines of the air flow over the blade. As can be seen, the air flow is very erratic and is rather turbulent with lots of vortices and irregular flow. This is mostly due to leading edge damage 42 and/or normal wear and tear. In FIGS. 5 and 6, leading edge protection 44 has been applied to the blade and an aerodynamic fence 46 has been added. Likewise a surface mounted lightning receptor 48 has also been mounted to the blade. The CFD results shown in FIGS. 5 and 6 are identical. FIG. 5 does not show the fence, tape and receptor while FIG. 6 schematically shows them in a very schematic manner so that the CFD results can be better understood. As can be seen by comparing the CFD results of FIG. 4 with the results of FIG. 5, it can be seen that the flow over the blade in the vicinity of the lightning receptor 48 is much cleaner in FIG. 5 than in FIG. 4. It is therefore expected that the lightning will strike the lightning receptor more accurately when the setup of FIG. 5 is compared with the setup of FIG. 4.

Figure 7:
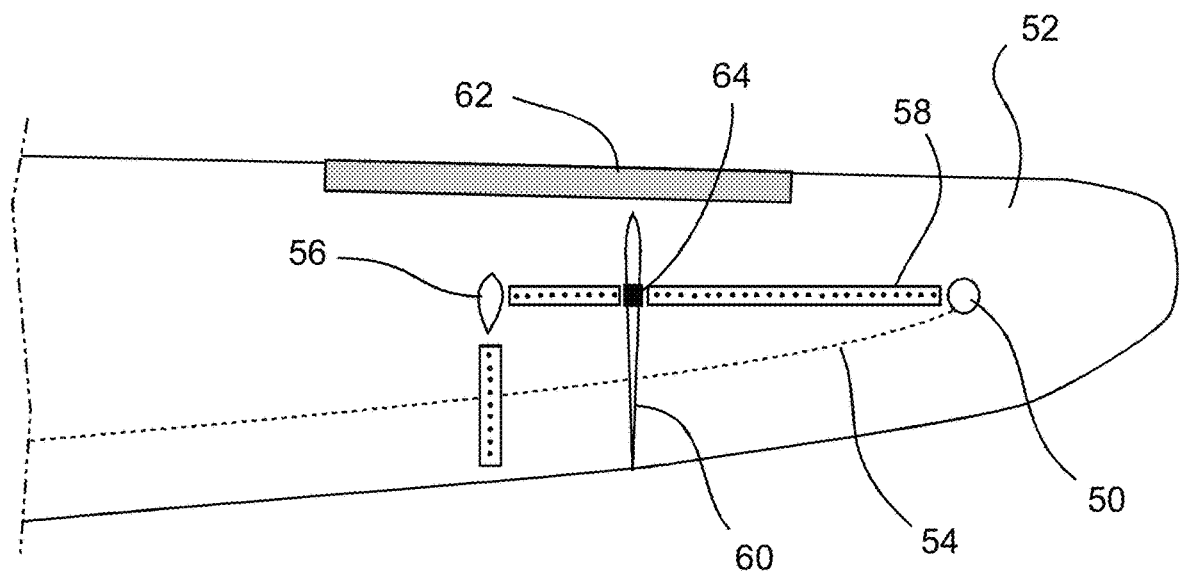
FIG. 7 shows a schematic top view of a fourth embodiment of a wind turbine blade with a lightning protection system according to the current invention.
Figure 8:
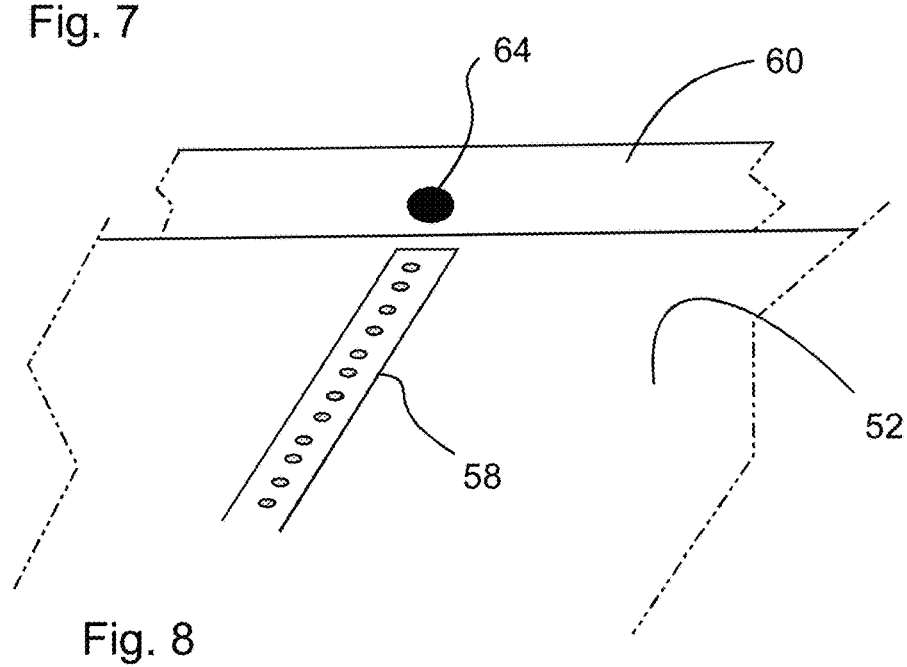
FIG. 8 shows a schematic perspective view of a portion of the embodiment of FIG. 7.
Figure 9:
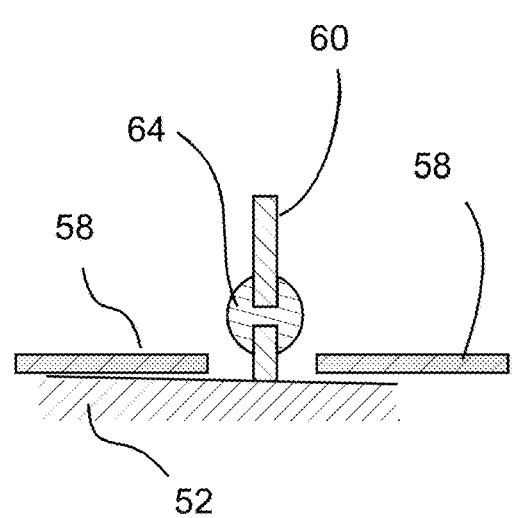
FIG. 9 shows a schematic cross section view of the fence of FIGS. 7 and 8.

FIG. 7 shows a different embodiment. As with the embodiments of FIGS. 1-3, this embodiment comprises an integrated lightning receptor 50 which was integrated with the wind turbine blade 52 at the factory. The integrated lightning receptor is connected to the base of the blade via an electrical conductor 54 which is also integrated into the body of the blade. The embodiment also comprises a surface mounted lightning receptor 56 and StrikeTape 58 which connects the surface mounted lightning receptor with the integrated lightning receptor. The embodiment also comprises an aerodynamic fence 60 to prevent cross flow and leading edge protection tape 62 to clean up the leading edge of the blade. In the previous embodiments, the StrikeTape was arranged to lead the electrical energy from a lightning strike around the fence. However, in this embodiment, the aerodynamic fence 60 is provided with a metal insert 64 passing through the body of the fence. In this way, the electrical energy can be lead through the fence instead of around it. FIG. 8 shows the StrikeTape 58 leading up to the metal insert 64 in the fence. Likewise FIG. 9 shows a cross section view through the fence 60, showing the metal insert 64 and the StrikeTape 58.

Figure 10:
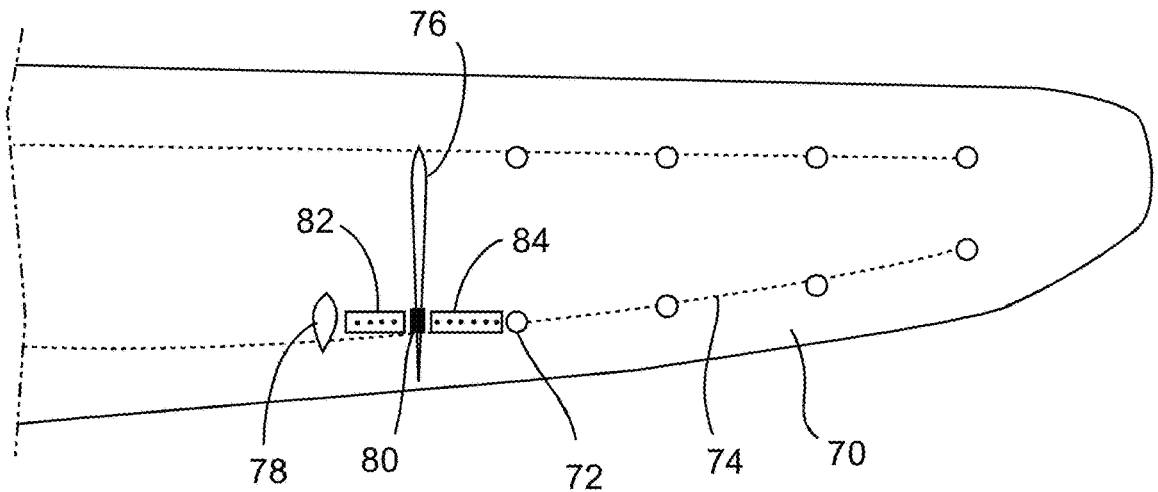
FIG. 10 shows a schematic top view of a fifth embodiment of a wind turbine blade with a lightning protection system according to the current invention.

FIG. 10 shows a different embodiment. In this embodiment, a wind turbine blade 70 is provided with eight integrated lightning receptors 72 connected to the base of the blade via two electrical conductors 74 which are also integrated with the blade. In this embodiment, an aerodynamic fence 76 is arranged inwardly of the innermost lightning receptor and a surface mounted lightning receptor 78 is arranged inwardly of the fence. As with the embodiment of FIG. 7, the aerodynamic fence 76 is provided with a metal insert 80 to allow electrical energy to pass through the fence. A first portion of StrikeTape 82 is provided between the surface mounted lightning receptor and the insert and a second portion StrikeTape 84 is provided between the insert and one of the integrated lightning receptors 72. In this way, when lightning strikes the surface mounted lightning receptor 78, the electrical energy is led via the first portion StrikeTape 82 through the insert 80 and then via the second portion StrikeTape 84 to the integrated lightning receptor 72 and then to the base of the blade via the integrated electrical conductor 74.

Figure 11:
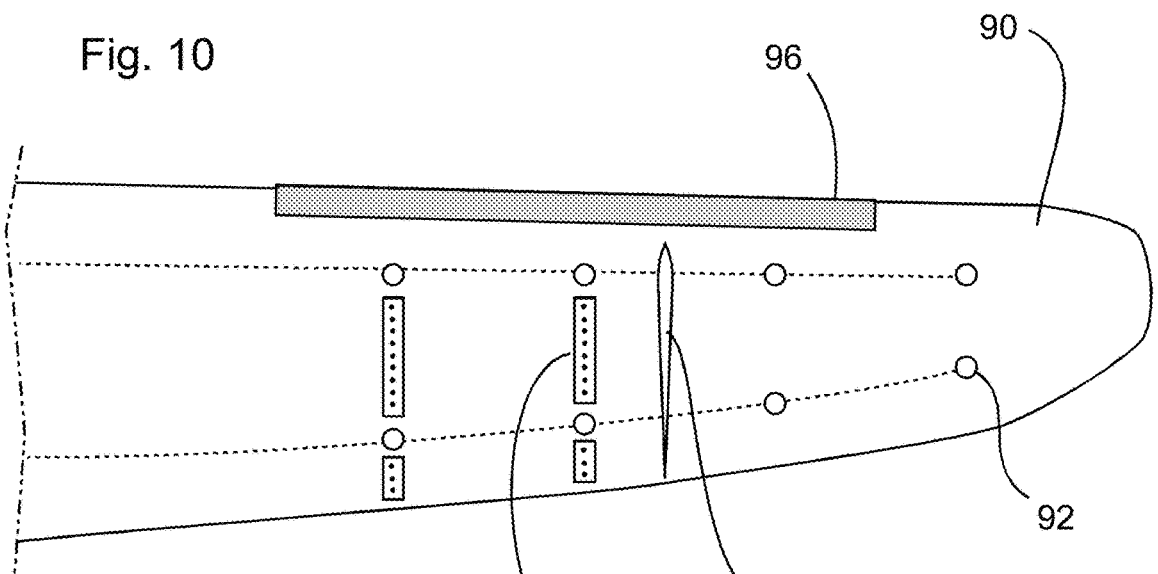
FIG. 11 shows a schematic top view of a sixth embodiment of a wind turbine blade with a lightning protection system according to the current invention.

FIG. 11 shows an embodiment of a wind turbine blade 90, again with eight integrated lightning receptors 92. However, in this embodiment, the aerodynamic fence 94 is mounted outwardly of the inner most four integrated lightning receptors. Furthermore, leading edge protection tape 96 is attached to the leading edge ahead of the four innermost integrated lightning receptors. In this way, the airflow around the innermost four integrated lightning receptors will be much cleaner than before the aerodynamic fence and the leading edge protection tape was mounted. StrikeTape 98 is added between adjacent integrated lightning receptors to provide an even larger target for the lightning and to provide additional paths for the electrical energy of a lightning strike to run along.

Figure 12:
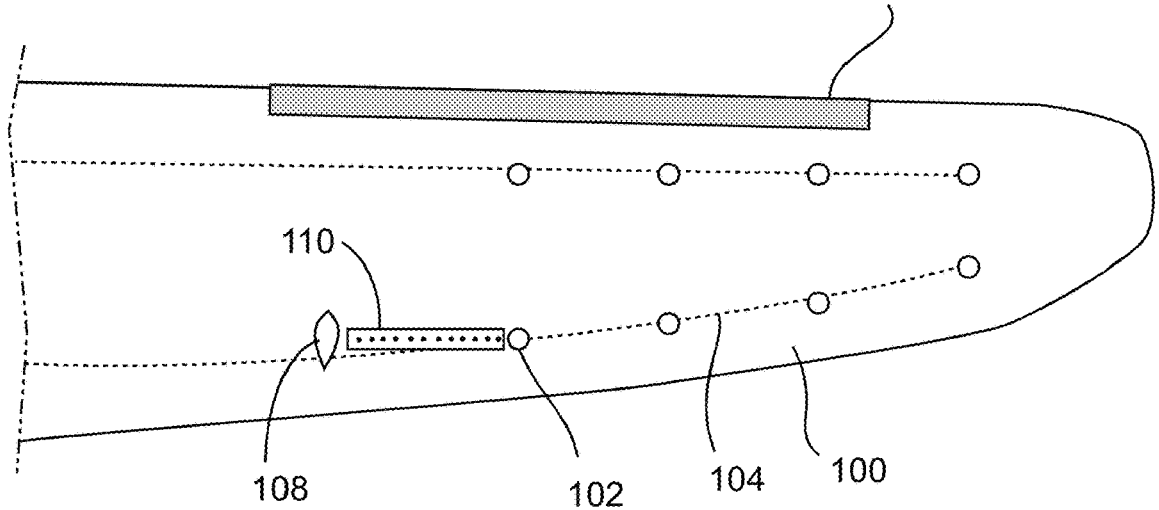
FIG. 12 shows a schematic top view of an example of an embodiment of a wind turbine blade with a lightning protection system according to a second invention.

FIG. 12 discloses an example of the second invention mentioned above. In this example, a wind turbine blade 100 is provided with eight integrated lightning receptors 102. The integrated lightning receptors are connected with the base of the blade via integrated electrical conductors 104. Leading edge protection tape 106 has been added to the blade to clean up the air flow over the blade. A surface mounted lightning receptor 108 has been attached to the surface of the blade inwardly of the inner most integrated lightning receptor and StrikeTape 110 is provided between the surface mounted lightning receptor and one of the integrated lightning receptors. This embodiment differentiates itself from the embodiments of the first invention in that no aerodynamic fence is provided. This embodiment differentiates itself from the prior art due to the provision of a surface mounted lightning receptor electrically connected to the integrated lightning receptor via StrikeTape.

It is to be noted that the figures and the above description have shown the example embodiments in a simple and schematic manner. Many of the specific mechanical details have not been shown since the person skilled in the art should be familiar with these details and they would just unnecessarily complicate this description. For example, the specific materials used and the specific manufacturing procedures have not been described in detail since it is maintained that the person skilled in the art would be able to find suitable materials and suitable processes to manufacture and mount the lightning protection system according to the current invention.

The invention claimed is:

1. Wind turbine blade comprising a lightning protection system, said lightning protection system comprising:
   a first lightning receptor mounted near the tip of the blade;
   an electrical conductor electrically connecting the first lightning receptor and the base of the wind turbine blade, and
   a first aerodynamic fence attached to the wind turbine blade between the lightning receptor and the tip of the blade, wherein the distance from the first lightning receptor to the aerodynamic fence is less than 1 m.

2. Wind turbine blade according to claim 1, wherein the distance from the first lightning receptor to the aerodynamic fence is less than 75 cm or less than 50 cm and in that the distance from the first lightning receptor to the aerodynamic fence is greater than 10 cm, greater than 20 cm or greater than 30 cm.

3. Wind turbine blade according to claim 1, wherein the distance from the tip of the blade to the first lightning receptor is greater than 50 cm, greater than 75 cm or greater than 100 cm and in that the distance from the tip of the blade to the first lightning receptor is less than 400 cm, less than 350 cm or less than 300 cm.

4. Wind turbine blade according to claim 1, further comprising a second lightning receptor which is integrated into the blade,
   wherein said electrical conductor comprises a first portion which is arranged between the second lightning receptor and the base of the blade;
   wherein the first lightning receptor is surface mounted on the surface of the blade; and
   wherein the electrical conductor comprises a second portion which is surface mounted on the blade and is arranged between the first lightning receptor and the second lightning receptor.

5. Wind turbine blade according to claim 4, wherein said first aerodynamic fence comprises a metal insert passing through a body portion of the first aerodynamic fence from a first side of the aerodynamic fence which faces the tip of the blade to a second side of the aerodynamic fence which faces the base of the blade, and
   wherein the second portion of the electrical conductor comprises a first part arranged between the first lightning receptor and the metal insert and a second part arranged between the metal insert and the second lightning receptor.

6. Wind turbine blade according to claim 4, wherein the second portion of the electrical conductor comprises one or more segmented lightning diverter strips.

7. Wind turbine blade according to claim 1, wherein said second portion of the electrical conductor and/or the first lightning receptor are attached to the blade via an adhesive.

8. Wind turbine blade according to claim 1, wherein the wind turbine blade further comprises a leading edge protection to reduce surface abnormalities on the leading edge of the wind turbine blade, said leading edge protection being arranged at least between the radial position of the first lightning receptor and the aerodynamic fence.

9. Wind turbine blade according to claim 1, further comprising a second aerodynamic fence located between the first lightning receptor and the base of the blade.

10. Wind turbine blade according to claim 1, wherein a flow disturbance element is added to the surface of the blade inwardly of the first lightning receptor.

* * * * *